United States Patent
Shimizu et al.

(10) Patent No.: US 7,640,265 B2
(45) Date of Patent: Dec. 29, 2009

(54) INFORMATION PROCESSING APPARATUS AND INFORMATION PROCESSING METHOD

(75) Inventors: Tomoyuki Shimizu, Kawasaki (JP);
Hiroyuki Nagai, Yokohama (JP);
Tsutomu Inose, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 11/695,899

(22) Filed: Apr. 3, 2007

(65) Prior Publication Data
US 2007/0239771 A1    Oct. 11, 2007

(30) Foreign Application Priority Data
Apr. 7, 2006    (JP)    ............... 2006-106626

(51) Int. Cl.
*G06F 7/00*    (2006.01)
(52) U.S. Cl. ..................................... 707/102
(58) Field of Classification Search ........ None
See application file for complete search history.

(56) References Cited

U.S. PATENT DOCUMENTS

2006/0036568 A1 *    2/2006    Moore et al. .................... 707/1

FOREIGN PATENT DOCUMENTS

JP    2000-250798    9/2000

* cited by examiner

*Primary Examiner*—Charles Rones
*Assistant Examiner*—Belix M Ortiz
(74) *Attorney, Agent, or Firm*—Cowan, Liebowitz & Latman, P.C.

(57) ABSTRACT

Metadata items commonly included in all sets are specified and displayed as common metadata items. When the user selects one of the displayed common metadata items as a designated common metadata item, metadata values in respective sets of an item indicated by this designated common metadata item are classified to any of a plurality of classification items determined based on the set condition. The plurality of classification items are list-displayed. When the user selects one of these plurality of classification items as a selected classification item, icons of contents data as sets with the metadata values classified to this selected classification item, and common metadata items other than the designated common metadata item of the displayed common metadata items are displayed.

7 Claims, 21 Drawing Sheets

- ■ DATE OF CREATION ORDER
- ■ SIZE ORDER
- ■ TITLE ORDER
- ■ ITEM TYPE ORDER

F I G. 20
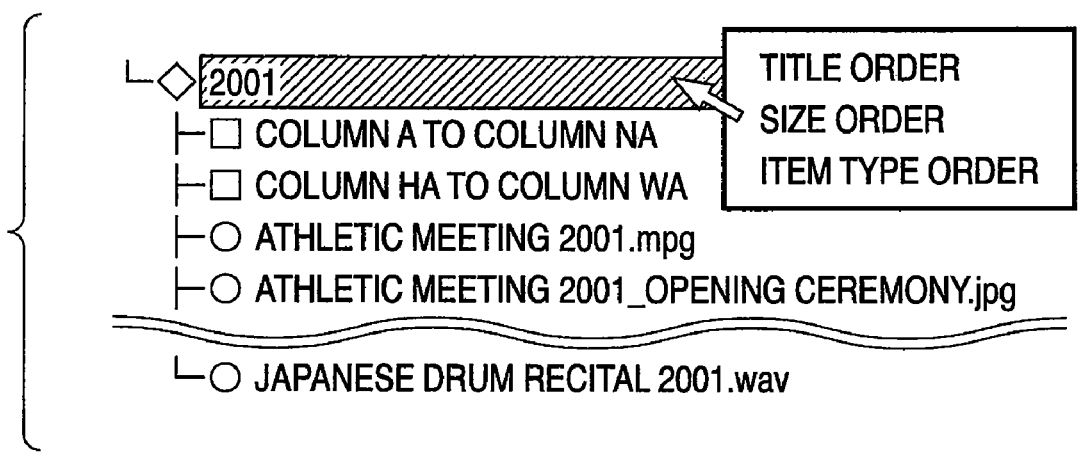

INFORMATION PROCESSING APPARATUS AND INFORMATION PROCESSING METHOD

BACKGROUND OF THE INVENTION

1. Field of the Invention

The present invention relates to a data management technique.

2. Description of the Related Art

In recent years, apparatuses which generate digital data such as personal computers (PCs), digital still cameras, digital video cameras, hard disk recorders, and the like have rapidly prevailed. In addition, since improvement of the inter-connectability of apparatuses via a network, development of the data distribution channels such as e-mail that distribute digital data, and the high-speed Internet and intranet, and an increase in capacity of storage devices in PCs, hard disk recorders, portable music players, and the like used to store digital data have progressed, various apparatuses around us store large amounts and a wide variety of digital data. In this way, in circumstances in which various apparatuses store large amounts of data, it becomes difficult to efficiently search for target data.

In contrast, a method of classifying data based on auxiliary information of data, for example, information such as the dates of creation, types of data, sizes of data, titles, and the like (these pieces of information are called "metadata", items such as the dates of creation, types, sizes, and the like are called "metadata items," and values set for these items are called "metadata values"), holding data together in folders and the like for respective metadata items, and hierarchically laying out and displaying these folders has been devised. In this method, the user can search for required data by tracing the hierarchically laid-out folders (called folder hierarchy) without working out complicated search formulas.

However, even when the predetermined folder hierarchy is one-sidedly presented, they may often not have a structure that the user intended, and it is not so efficient to search for data by tracing such a folder hierarchy.

Hence, a method which allows the user to designate the order of layers of the folders which hold data together for respective metadata items, and helps the user form the intended folder hierarchy has been proposed (see Japanese Patent Laid-Open No. 2000-250798).

However, the method disclosed in Japanese Patent Laid-Open No. 2000-250798 provides means for forming folder hierarchy that reflects the user's intention, but the user must decide the hierarchical relationship of metadata items in a trial and error manner, and the user still bears a heavy burden. Depending on the data to be handled, the display system of the folder hierarchy that the user requires may change. However, there is no mechanism to form the folder hierarchy that can follow such changes.

SUMMARY OF THE INVENTION

The present invention has been made in consideration of the aforementioned problems, and has as its object to provide a technique which allows the user to make flexible operations for a folder hierarchy, and to easily search for data by more intuitive operations.

According to the present invention, the foregoing object is attained by providing an information processing apparatus comprising:

holding unit adapted to hold a plurality of sets of contents data, a plurality of pieces of item information indicating a plurality of items associated with the contents data, and a plurality of pieces of value information indicating values of respective items;

specifying unit adapted to specify item information commonly included in all the sets as common item information;

first display unit adapted to display one or more pieces of common item information specified by the specifying unit as information on a first layer of hierarchy;

classification unit adapted to classify, when one of the one or more pieces of common item information displayed by the first display unit is selected as selected common item information, a plurality of pieces of value information in respective sets of an item indicated by the selected common item information to any of a plurality of classification items determined based on a set condition;

a second display unit adapted to display a list of the plurality of classification items as information on a second layer of hierarchy as a layer of hierarchy immediately below the first layer of hierarchy; and third display unit adapted to display, when one of the plurality of classification items is selected as a selected classification item, a plurality of pieces of contents data information indicating contents data as sets with the plurality of pieces of value information classified to the selected classification item, and a plurality of pieces of common item information other than the selected common item information of the one or more pieces of common item information as information displayed on a third layer of hierarchy as a layer of hierarchy immediately below the second layer of hierarchy.

According to another aspect of the present invention, the foregoing object is attained by providing an information processing method comprising:

a holding step of holding a plurality of sets of contents data, a plurality of pieces of item information indicating a plurality of items associated with the contents data, and a plurality of pieces of value information indicating values of respective items;

a specifying step of specifying item information commonly included in all the sets as common item information;

a first display step of displaying one or more pieces of common item information specified in the specifying step as information on a first layer of hierarchy;

a classification step of classifying, when one of the one or more pieces of common item information displayed in the first display step is selected as selected common item information, a plurality of pieces of value information in respective sets of an item indicated by the selected common item information to any of a plurality of classification items determined based on a set condition;

a second display step of displaying a list of the plurality of classification items as information on a second layer of hierarchy as a layer of hierarchy immediately below the first layer of hierarchy; and a third display step of displaying, when one of the plurality of classification items is selected as a selected classification item, a plurality of pieces of contents data information indicating contents data as sets with the plurality of pieces of value information classified to the selected classification item, and a plurality of pieces of common item information other than the selected common item information of the one or more pieces of common item information as information displayed on a third layer of hierarchy as a layer of hierarchy immediately below the second layer of hierarchy.

Further features of the present invention will become apparent from the following description of exemplary embodiments with reference to the attached drawings.

BRIEF DESCRIPTION OF THE DRAWINGS

FIG. 20 shows an example of making the user select a pop-up list that displays selection candidates of common metadata items in folders of classification items.

DESCRIPTION OF THE EMBODIMENTS

Preferred embodiments of the present invention will now be described in detail in accordance with the accompanying drawings.

First Embodiment

Figure 1:
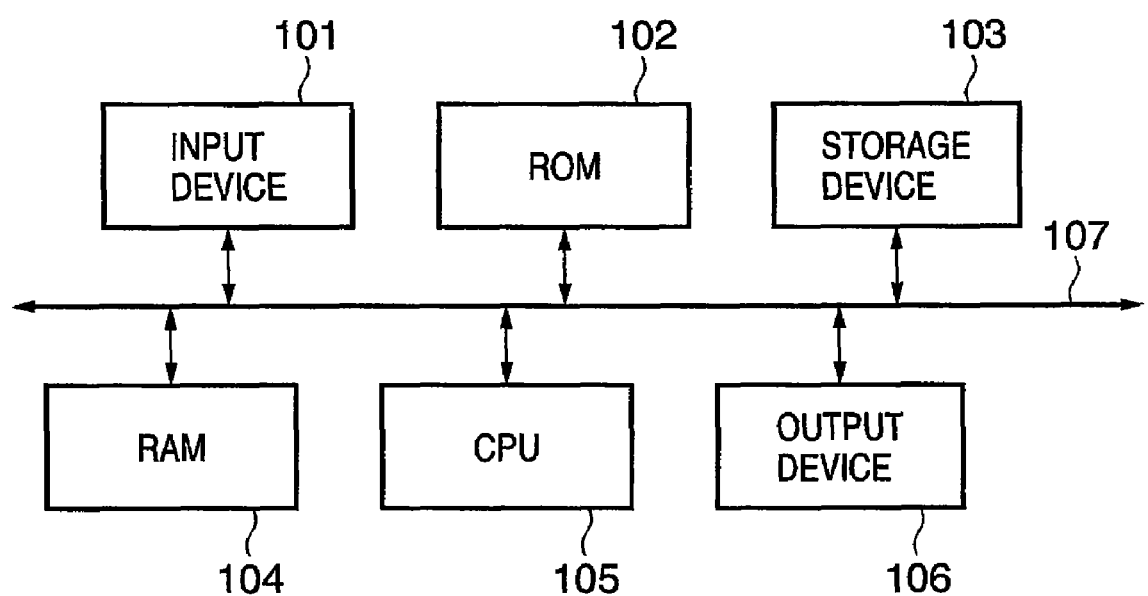
FIG. 1 is a block diagram showing the hardware arrangement of a computer which can be applied to an information processing apparatus according to the first embodiment of the present invention.

FIG. 1 is a block diagram showing the hardware arrangement of a computer which can be applied to an information processing apparatus according to this embodiment.

Reference numeral 101 denotes an input device, which comprises a keyboard, mouse, microphone, and the like, and is used when the user inputs various instructions. Therefore, the input device 101 can comprise arbitrary devices as long as it is used for such purpose.

Reference numeral 102 denotes a ROM which stores setting data, a boot program, and the like of this computer.

Reference numeral 103 denotes a storage device which is a large-capacity information storage device represented by a hard disk or the like, and stores an OS (operating system), and programs and data required to make a CPU 105 execute respective processes to be implemented by this computer. The storage device 103 stores various contents data as objects to be processed (to be described later). The storage form of the contents data will be described in detail later.

Reference numeral 104 denotes a RAM which has an area for temporarily storing programs and data loaded from the storage device 103, a work area used when the CPU 105 executes various kinds of processing, and the like. That is, the RAM 104 provides various areas.

Reference numeral 105 denotes a CPU which controls the overall computer using programs and data stored in the RAM 104 and ROM 102, and executes respective processes to be described later implemented by this computer.

Reference numeral 106 denotes an output device which comprises a display device such as a CRT, liquid crystal display, or the like in this embodiment. However, the output device 106 may comprise a device for outputting an audio. When the output device 106 is a display device, this display screen displays the processing result of the CPU 105 in a form of images, text, and the like.

Reference numeral 107 denotes a bus which connects the aforementioned respective units.

Note that the hardware arrangement of this computer is not limited to this. For example, a device for reading information from storage media such as a CD-ROM, DVD-ROM, and the like may be added to the arrangement of this computer and a memory card, magnetic or optical card, IC card, or the like may be added to the arrangement of this computer.

Figure 2:
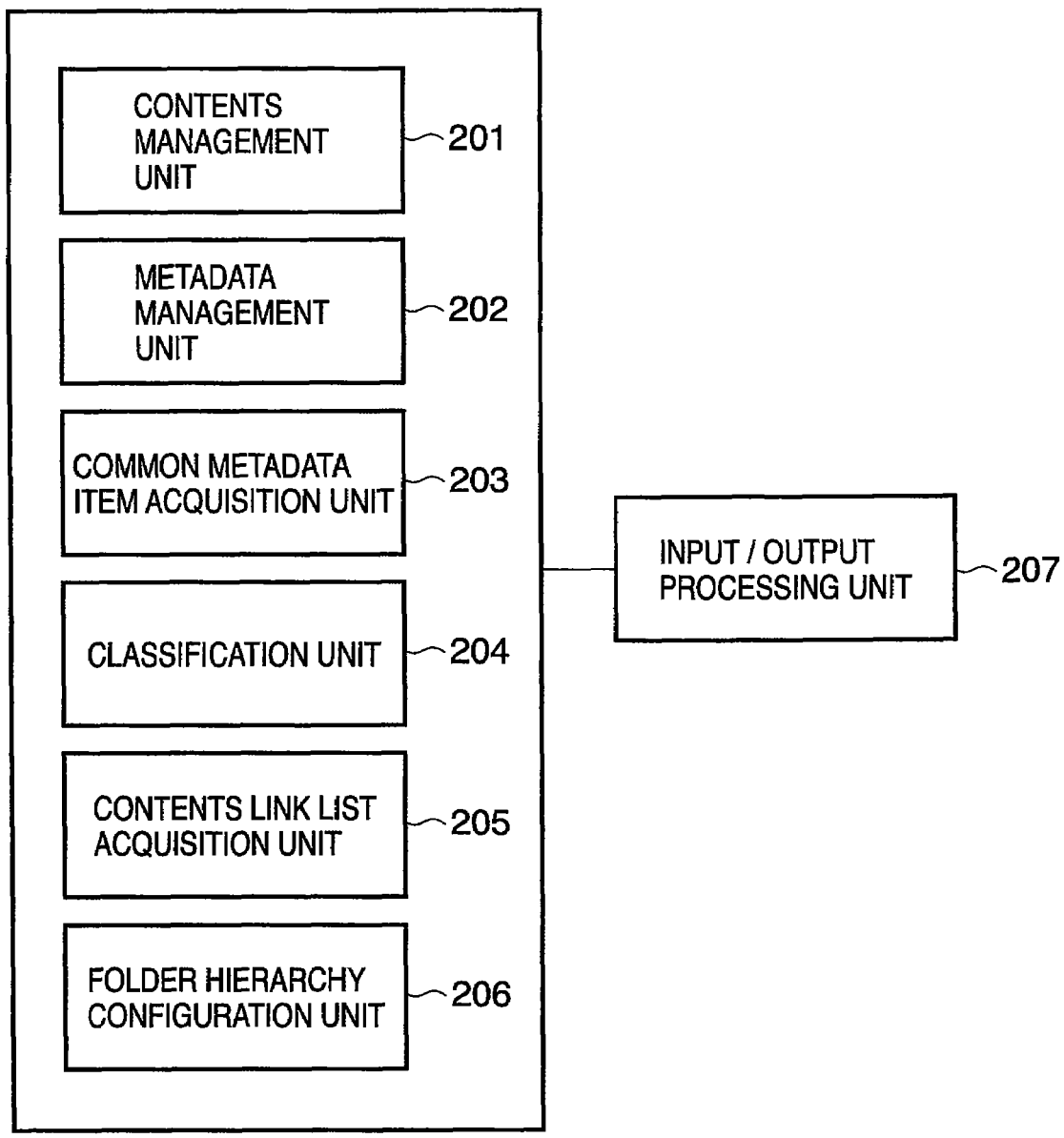
FIG. 2 is a block diagram showing the functional arrangement of the computer.

FIG. 2 is a block diagram showing the functional arrangement of this computer.

Referring to FIG. 2, reference numeral 201 denotes a contents management unit which manages contents data such as document data, still image data, moving image data, music data, and the like.

Reference numeral 202 denotes a metadata management unit which manages item information (metadata items) indicating a plurality of items that pertain to contents data managed by the contents management unit 201, and value information (metadata values) indicating the values of the respective items. In the following description, a combination of the metadata item and metadata value will often be referred to as metadata. That is, metadata are available in correspondence with the contents data.

Note that the metadata management unit 202 manages the metadata items and metadata values in the form of "metadata item 1=metadata value 1, metadata item 2=metadata value 2, . . . , metadata item n=metadata value n" together with corresponding contents data. For example, when the contents data is still image data, its metadata items and metadata values are managed in the form of "the date of creation=2001/10/10, size 120KB, title="athletic meeting 2001_opening ceremony", item type=still image, file type=JPEG, and position information=(35° 35' 11", 139° 37' 18")" together with this still image data.

Note that the management form of the contents data and metadata is not particularly limited, and any other management forms may be used as long as they are managed as sets (in association with each other).

Referring back to FIG. 2, reference numeral 203 denotes a common metadata item acquisition unit which acquires all the metadata items from the metadata management unit 202, and then acquires items (common metadata items) commonly included in all the acquired metadata items. For example, when items indicated by metadata items set with given still image contents data are "date of creation", "size", "title", "item type", "file type", and "position information", and those indicated by metadata items set with given moving image contents data are "date of creation", "size", "playback time", "title", "item type", and "file type", common metadata items are "date of creation", "size", "title", "item type", and "file type".

Reference numeral 204 denotes a classification unit which acquires metadata values of the common metadata items acquired by the common metadata item acquisition unit 203, and classifies them to some of a plurality of classification items determined based on set classification folder generation conditions.

Reference numeral 205 denotes a contents link list acquisition unit which acquires link information to contents data set with the metadata values classified by the classification unit 204.

Reference numeral 206 denotes a folder hierarchy configuration unit which generates hierarchical structure data of folders (folder hierarchical structure data) by hierarchically laying out folders for respective common metadata items acquired by the common metadata item acquisition unit 203 and those for respective classification items classified by the classification unit 204. The folder hierarchical structure data expresses the hierarchical relationship of folders, and records folder information having a parent-child relationship for respective folders in this embodiment. Note that the configuration sequence of the hierarchical structure of folders will be described in detail later using the flowcharts shown in FIGS. 3 to 5.

Reference numeral 207 denotes an input/output processing unit, which outputs the folder hierarchical structure via the output device 106 based on the folder hierarchical structure data generated by the folder hierarchy configuration unit 206, and receives a selection instruction input from the user for the displayed folder hierarchy, classification folder generation condition setting inputs, and the like via the input device 101.

Note that in this embodiment, the CPU 105 implements the respective units shown in FIG. 2 in the form of executable programs. However, the present invention is not limited to such a specific implementation, and some or all of the units shown in FIG. 2 may be implemented by hardware.

The operation of the information processing apparatus according to this embodiment will be described below using the flowcharts shown in FIGS. 3 to 5.

In the following description, assume that a plurality of sets of contents data and metadata are held in the storage device 103. However, a device that holds these sets is not limited to the storage device 103. For example, these sets may be stored in a device provided outside the information processing apparatus according to this embodiment.

Figure 3:
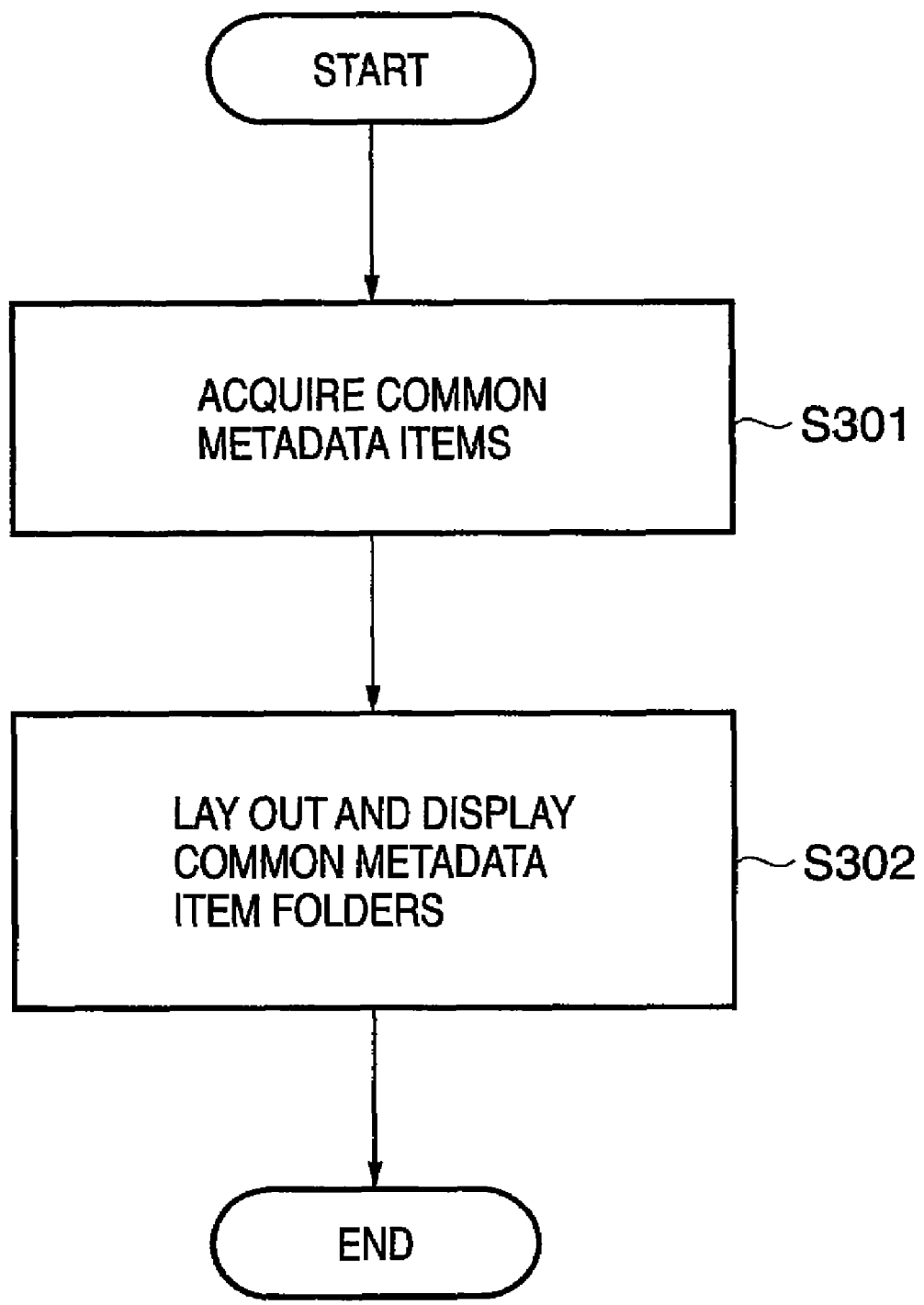
FIG. 3 is a flowchart of the processing for acquiring common metadata items of a plurality of metadata held in a storage device 103, and displaying the acquired metadata items on the display screen of an output device 106.

FIG. 3 is a flowchart of the processing for acquiring common metadata items of the plurality of metadata held in the storage device 103, and displaying the acquired metadata items on the display screen of the output device 106. Note that the storage device 103 stores programs and data for making the CPU 105 execute the processes according to the flowchart shown in FIG. 3 and those shown in FIGS. 4 and 5, and these programs and data are loaded into the RAM 104 as needed under the control of the CPU 105. When the CPU 105 executes the processes using the loaded programs and data, the computer implements respective processes (those according to the flowcharts shown in FIGS. 3 to 5) to be described below.

In step S301, the CPU 105 serves as the common metadata item acquisition unit 203. That is, the CPU 105 refers to metadata items in all the sets stored in the storage device 103, and specifies items (common metadata items) commonly included in all the metadata items. Note that the execution timing of the process in this step may be this timing or the process in this step may be executed beforehand. In some cases, schemas of metadata to be given for respective data types may be determined in advance. In such a case, common metadata items may be acquired with reference to the definitions of the schemas.

In step S302, the CPU 105 serves as the folder hierarchy configuration unit 206. That is, the CPU 105 generates folder hierarchical structure data indicating a configuration that arranges folders of the common metadata items acquired in step S301 as "information in the same layer of hierarchy". The CPU 105 then displays the folders of the common metadata items acquired in step S301 on the display screen of the output device 106 in accordance with the generated folder hierarchical structure data. That is, the CPU 105 arranges the folders of the common metadata items acquired in step S301 as "information in the same layer of hierarchy", and displays them on the display screen of the output device 106.

Figure 6:
FIG. 6 shows a display example when a list of folders of one or more common metadata items is displayed in step S302.

FIG. 6 shows a display example when a list of folders of one or more common metadata items is displayed in step S302. In FIG. 6, a list of a "date of creation" folder, "size" folder, "title" folder, and "item type" folder is displayed as the folders of the common metadata items on the same layer of hierarchy.

Assume that symbols used in FIG. 6, and subsequent FIGS. 7 to 14 and FIGS. 18 to 21 have the following meanings.
● . . . folder of a common metadata item (closed)
♦ . . . folder of a common metadata item (opened)
☐ . . . classification folder (closed)
◇ . . . classification folder (opened)
○ . . . link to contents data The above symbols are used for descriptive purposes, but these symbols need not be used upon display, and icons having arbitrary shapes may be used as needed. Every form may be displayed in place of folders.

Figure 4:
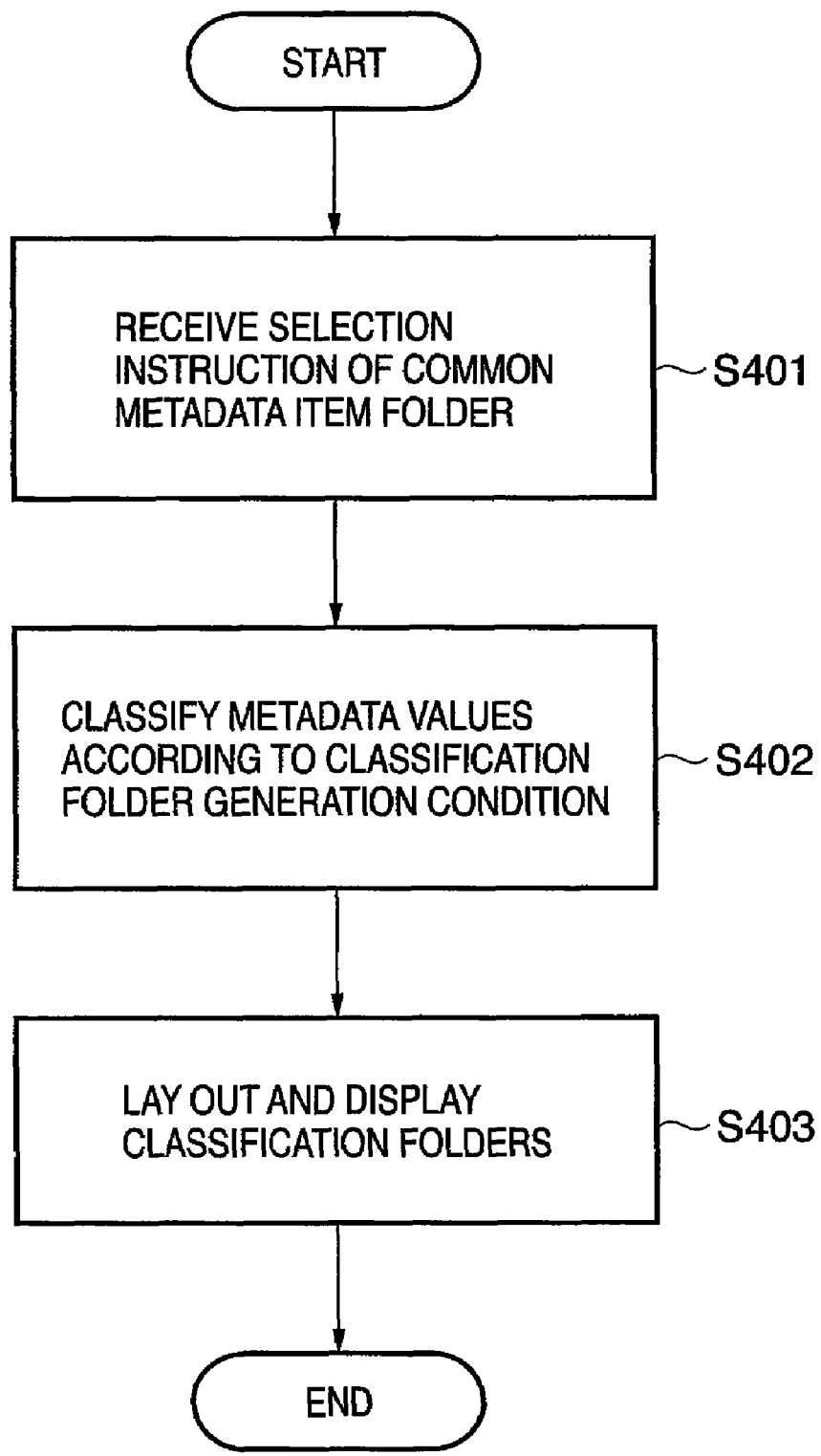
FIG. 4 is a flowchart of the processing executed when the user designates (selects) one of the common metadata items displayed on the display screen of the output device 106 in the step S302.

FIG. 4 is a flowchart of the processing executed when the user designates (selects) one of the common metadata items displayed on the display screen of the output device 106 in the step S302.

When the operator of this computer designates, using the input device 101, one of the folders of the common metadata items displayed on the display screen of the output device 106 in the step S302, the CPU 105 detects this designation in step S401, and specifies the designated common metadata item.

In step S402, the CPU 105 serves as the classification unit 204. That is, the CPU 105 classifies metadata values in respective sets of the item indicated by the designated common metadata item into some of a plurality of classification items determined based on the classification folder generation conditions which are set in advance.

In step S403, the CPU 105 serves as the folder hierarchy configuration unit 206. That is the CPU 105 generates folder hierarchical structure data indicating a configuration that arranges folders of respective classification items immediately below the designated common metadata item. The CPU 105 then arranges the folders of the respective classification items immediately below the designated common metadata item according to the generated folder hierarchical structure data and displays, in the form of a list, them on the display screen of the output device 106. This list display form displays the folders of the respective classification items as information in the lower layer of hierarchy than the designated common metadata item.

Figure 7:
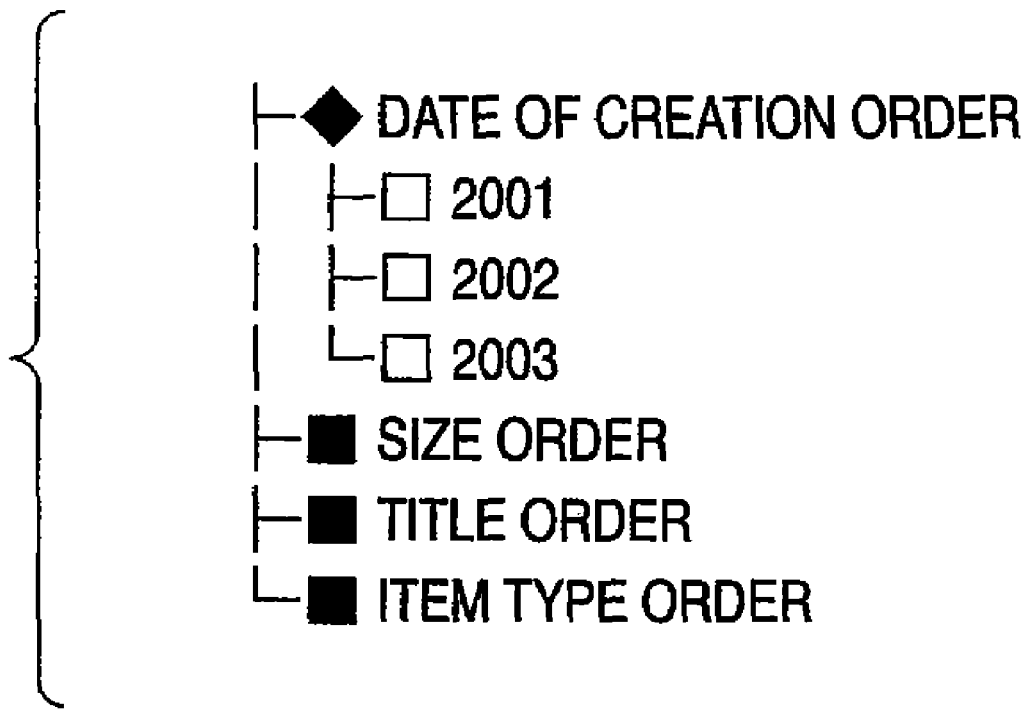
FIG. 7 shows a display example in step S403.

FIG. 7 shows a display example in step S403. In FIG. 7, since the user designates a common metadata item "date of creation" on the list window shown in FIG. 6, and "by year" is set as the classification folder generation condition, folders of the classification items "2001", "2002", and "2003" are arranged immediately below the common metadata item "date of creation". The display form of FIG. 7 shows that the folders of the respective classification items are located on the layer of hierarchy immediately below the folder of the designated common metadata item.

Upon making the display shown in FIG. 7 in step S403, the CPU 105 specifies "date of creation" as the designated common metadata item in step S401. In step S402, the CPU 105 refers to the "date of creation" values in all the metadata values, and classifies them to any of classification items (year). For example, folders having a "date of creation" value (metadata value) "May 3, 2001" are classified into a classification item "2001", and folders having a "date of creation" value (metadata value) "Jan. 5, 2003" are classified into a classification item "2003". In step S403, the CPU 105 arranges folders of classification items "2001", "2002", and "2003" immediately below the designated common metadata item and displays them on the display screen of the output device 106.

Note that the classification folder generation conditions are those which can cyclopaedically classify data. As the classification folder generation conditions, conditions such as "classify to obtain the designated number of divisions", "classify to obtain given numbers of contents in classification folders", "classify items with the same metadata value", and so forth are assumed.

For example, a description will be given using FIG. 7. For the common metadata item "date of creation", "the month in the metadata value is the same", "the year in the metadata value is the same", "divide into n folders", and "divide every n contents" are selectable in advance, and the classification folder generation condition can be set to classify based on "the year in the metadata value is the same" of these conditions. In this way, classification folders "2001", "2002", and "2003" are generated.

Note that default classification folder generation conditions are set in advance, and the user may re-set them using the input device 101 as needed. Since the classification folder generation condition like "the year in the metadata value is the same" depends on the metadata item, such conditions are set for respective metadata items. For example, since the condition that limits the number of classification folders to be equal to or smaller than N may be set for the convenience of display, settings common to the system may be set independently of metadata items.

Note that contents to be classified can be held in any of classification folders and empty folders are never formed since the classification folders are generated based on a group of metadata of contents data. At this time, some contents data have metadata items but no metadata values are input. Such contents data may be held in any of classification folders or a classification folder "no metadata value" may be laid out. For example, if there is contents data with a common metadata item "date of creation=<null> (not set)", classification folders "2001", "2002", and "2003, etc." may be laid out immediately below the "date of creation" folder.

As described above, when the user designates one of the common metadata items, the metadata values of the designated common metadata item are classified to any of a plurality of classification items determined based on the set conditions, and folders of this plurality of classification items can be arranged and displayed immediately below the designated common metadata item.

Figure 5:
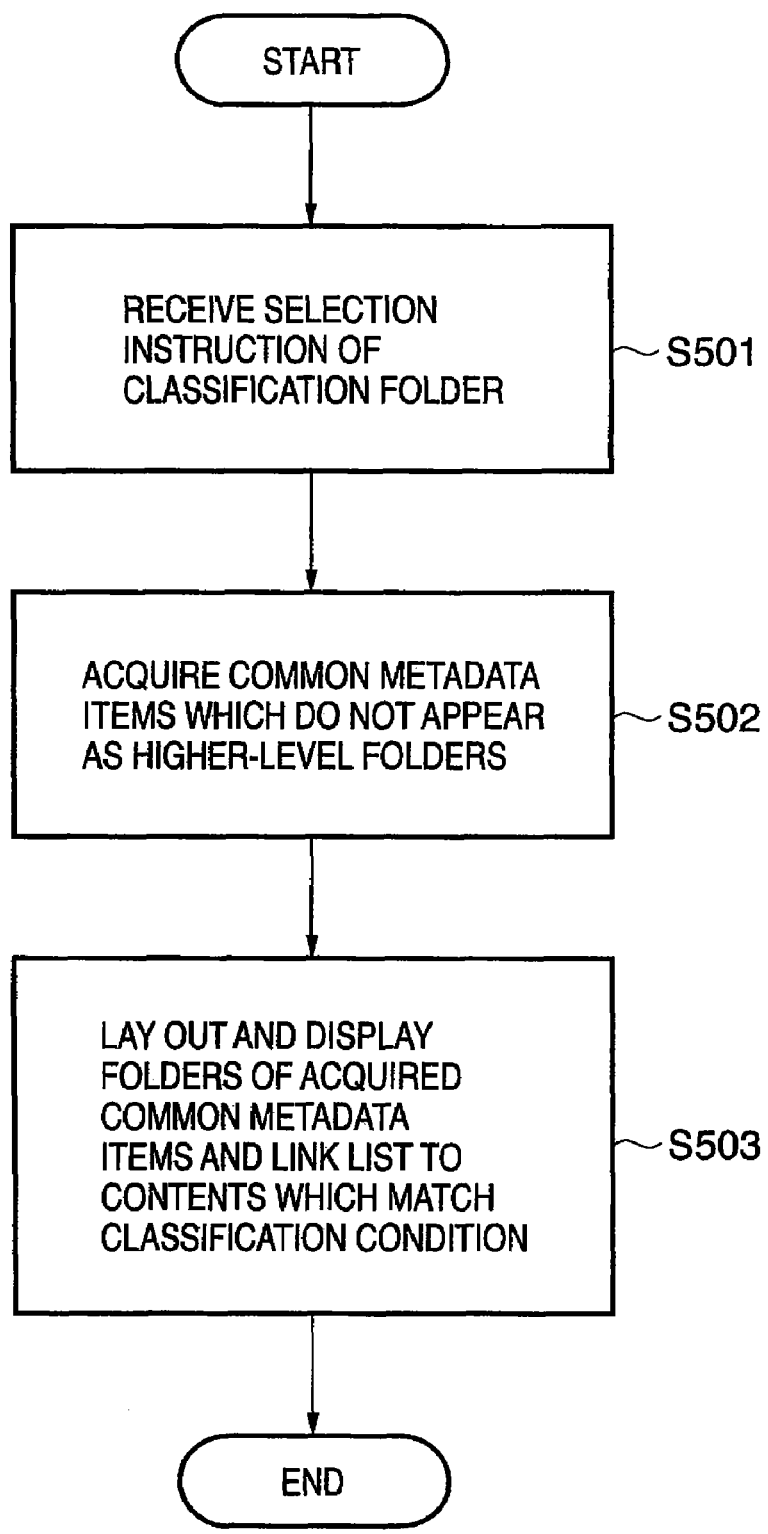
FIG. 5 is a flowchart of the processing executed when the user designates one of folders of classification items which are list-displayed in step S403.

FIG. 5 is a flowchart showing the processing executed when the user designates one of the folders of classification items which are displayed, in the form of a list, in step S403.

When the operator of this computer designates one of the folders of classification items displayed on the display screen of the output device 106 in step S403 using the input device 101, the CPU 105 detects this designation, and specifies the designated classification item in step S501.

In step S502, the CPU 105 specifies common metadata items other than the designated common metadata item (in case of FIG. 7, common metadata items other than the designated common metadata item "date of creation order" of all the common metadata items "date of creation order", "size order", "title order", and "item type order" specified in the step S301) of those which are displayed as information on the layer of hierarchy immediately above the designated classification item specified in step S501.

In step S503, the CPU 105 generates folder hierarchical structure data which indicates a configuration in which the common metadata items specified in step S502 are arranged immediately below the designated classification item specified in the step S501, and icons indicating contents data as sets with metadata values classified to the designated classification item specified in step S501 are arranged immediately below the folder of the designated classification item specified in the step S501.

Then, the CPU 105 displays, on the display screen of the output device 106, a window on which the common metadata items specified in step S502 are arranged immediately below the folder of the designated classification item specified in step S501 according to the folder hierarchical structure data, and icons indicating contents data as sets with metadata values classified to the designated classification item specified in step S501 are arranged immediately below the folder of the designated classification item specified in the step S501. This display form is form for displaying the common metadata items specified in step S502 and the icons indicating the contents data as sets with the metadata values classified to the designated classification item specified in step S501 as information on the layer of hierarchy lower than the designated classification item.

Figure 8:
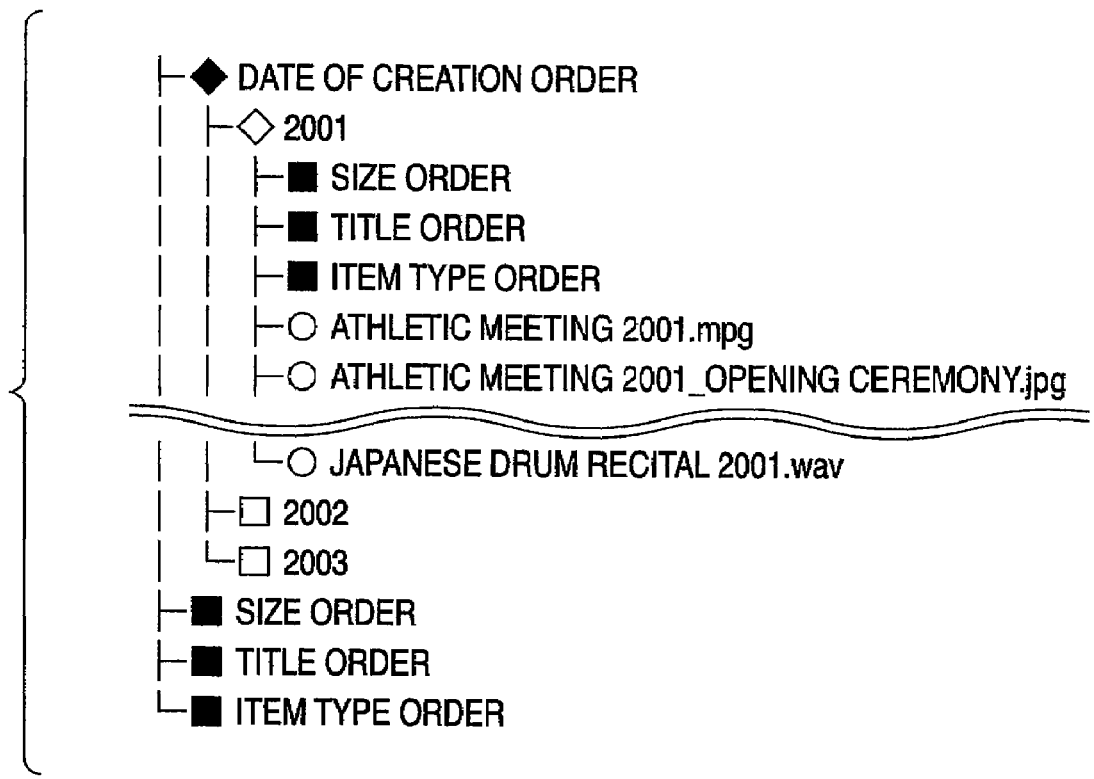
FIG. 8 shows a display example in step S503.

FIG. 8 shows a display example in step S503. FIG. 8 shows a display example when the user designates the folder of the classification item "2001" in FIG. 7. As shown in FIG. 8, since the user designates "date of creation" as the designated common metadata item, and designates "2001" as the designated classification item, the folders of the common metadata items other than the designated common metadata item of those which are displayed as information on the layer of hierarchy immediately above the designated classification item are arranged, and icons (those which indicate file names in FIG. 8) indicating the contents data as sets with the metadata classified to the classification item "2001" are arranged on the same layer of hierarchy.

As described above, the display form of FIG. 8 indicates that the folders of the common metadata items other than the designated common metadata item of those which are displayed as information on the layer of hierarchy immediately above the designated classification item, and icons indicating the contents data as sets with the metadata values classified to the classification item "2001" are located on the layer immediately below the folder of the designated classification item "2001".

In this way, by designating the folder of the classification item, icons indicating contents data as sets with the metadata values classified to this classification item are arranged and displayed immediately below the folder of the classification item, and the common metadata items other than the designated common metadata item of those which are displayed as information immediately above the designated classification item are arranged and displayed on the same layer of hierarchy.

Figure 9:
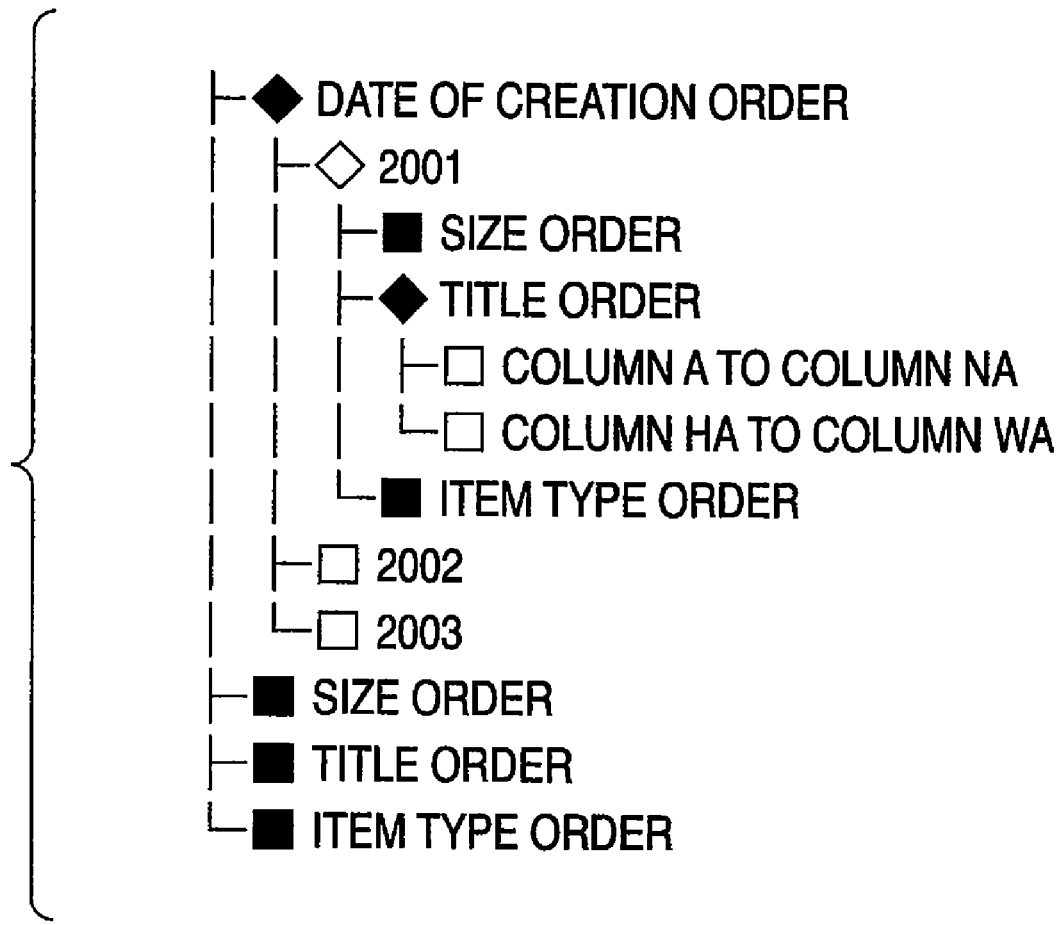
FIG. 9 shows a display example of a window displayed on the display screen of the output device 106 when the user designates a folder of the common metadata item "title order" located on the layer of hierarchy immediately below a folder of classification item "2001" on the window shown in FIG. 8.

Furthermore, when the user designates the folder of the common metadata item "title order" located on the layer of hierarchy immediately below the folder of the classification item "2001", a window exemplified in FIG. 9 is displayed on the display screen of the output device 106. In this way, the processing to be executed by the computer when the user designates the common metadata item located immediately below the folder of the classification item basically follows the flowchart of FIG. 4.

More specifically, in this case, the CPU 105 specifies the designated common metadata item "title order" in step S401, and classifies metadata values classified to the folder of the classification item "2001" to any of classification items "column A to column NA" and "column HA to column WA" with reference to title items of these metadata values. The CPU 105 arranges and lays out the folders of the classification items "column A to column NA" and "column HA to column WA" immediately below the folder of the common metadata item "title order".

Note that the classification folder generation conditions used in this case correspond to the designated common metadata item. In FIG. 9, the classification folder generation conditions are set to classify titles in metadata values to one of "column A to column NA" and "column HA to column WA".

Figure 10:
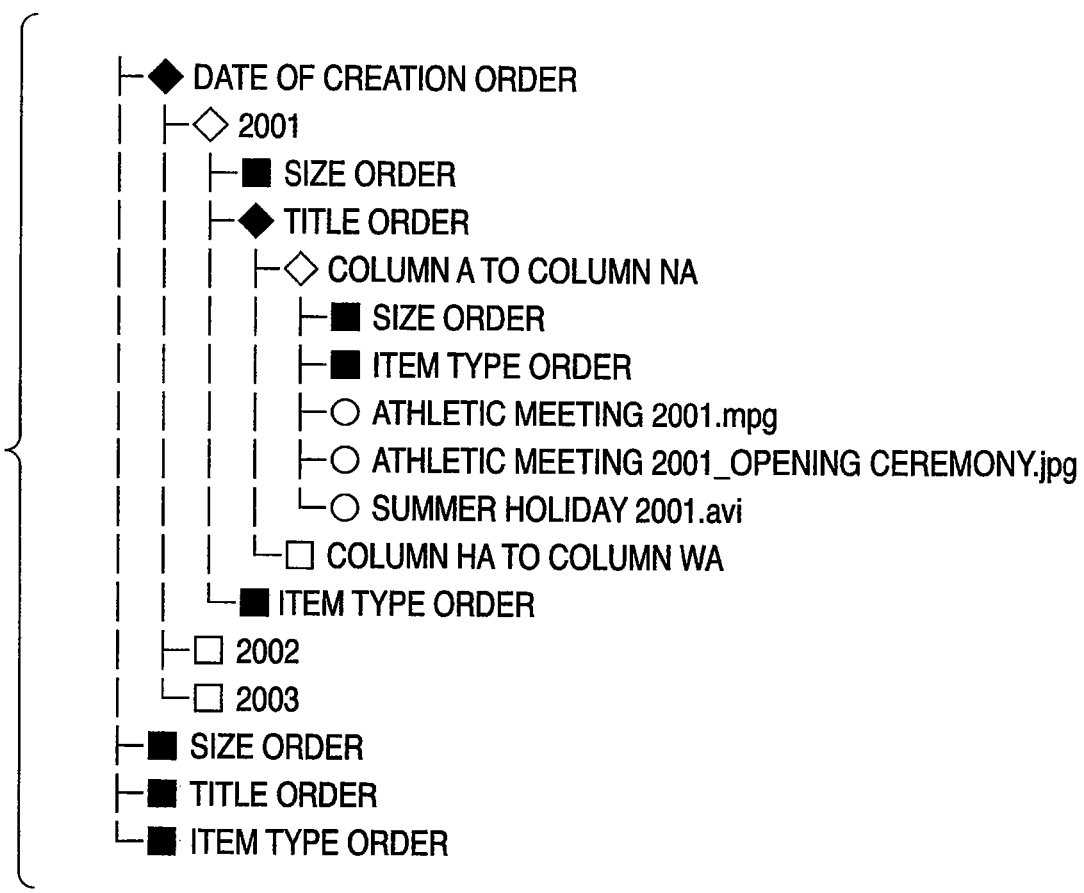
FIG. 10 shows a display example of a window displayed on the display screen of the output device 106 when the user designates a folder of the common metadata item "column A to column NA" located on the layer of hierarchy immediately below the folder of classification item "2001" on the window shown in FIG. 8.
Figure 11:
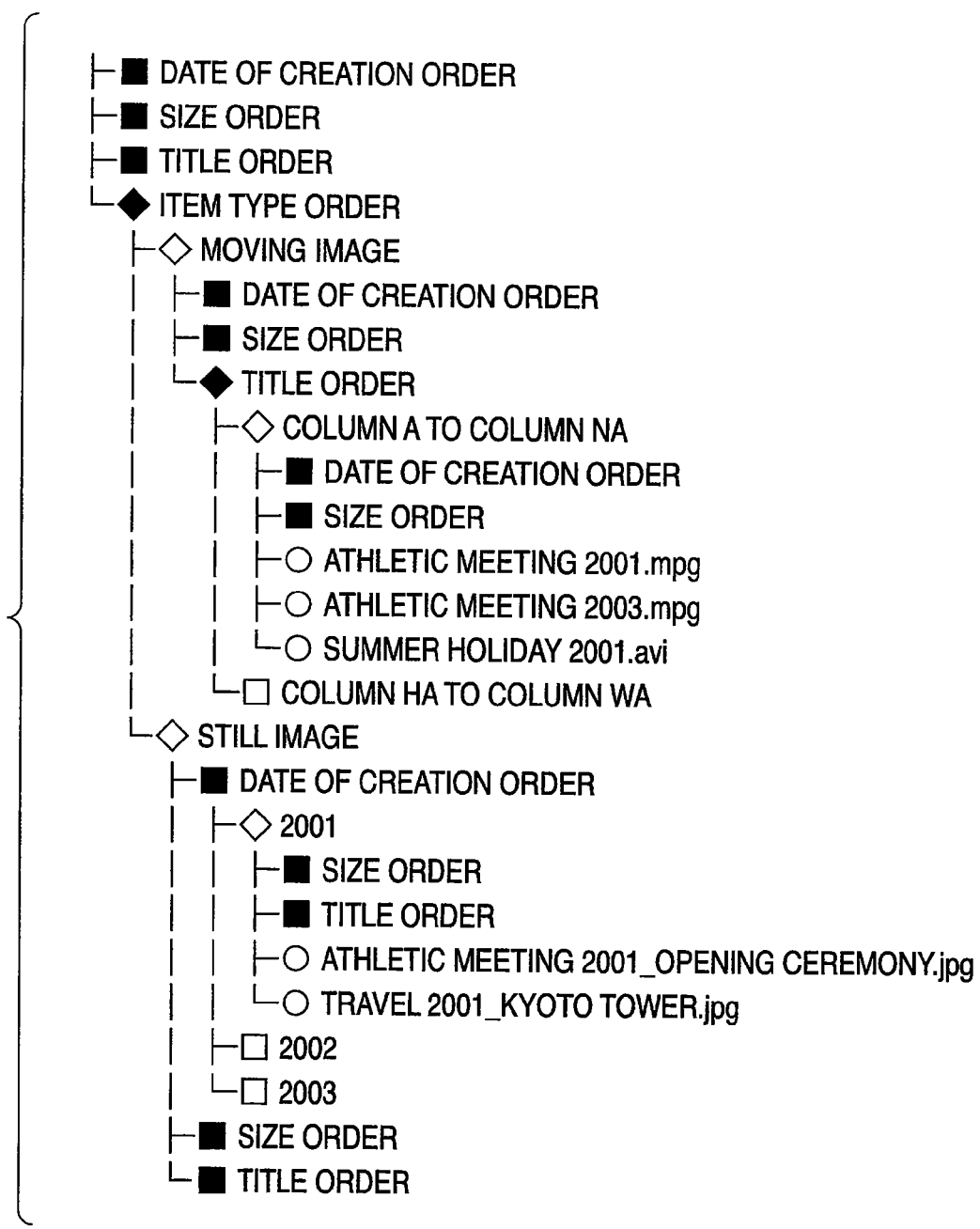
FIG. 11 shows an example upon opening a plurality of folders such as a "moving image" folder and "still image" folder at the same time.
Figure 12:
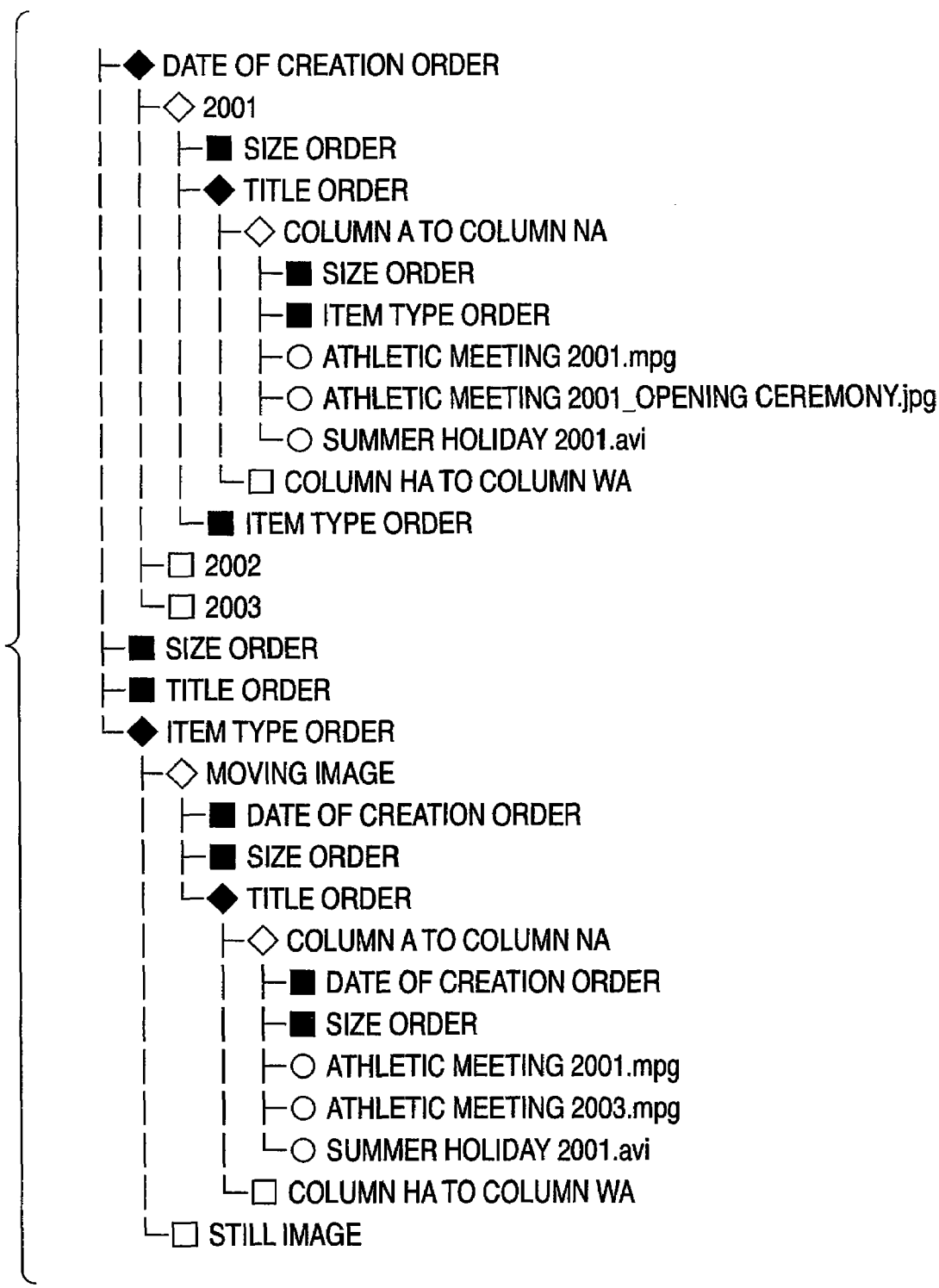
FIG. 12 shows an example upon opening a plurality of common metadata item folders like a "date of creation order" folder and "item type order" folder at the same time.

Moreover, when the user designates the folder of the classification item "column A to column NA" on the window shown in FIG. 9, a window exemplified in FIG. 10 is displayed on the display screen of the output device 106. As shown in FIG. 10, upon designating the folder of the classification item "column A to column NA", the folders of common metadata items "size order" and "item type order" other than the designated common metadata item "title order" of the common metadata items "size order", "title order", and "item type order" displayed as information on the layer of hierarchy immediately above the designated classification item are arranged and displayed immediately below the folder of the classification item "column A to column NA", and icons indicating contents data as sets with the metadata values classified to the classification item "column A to column NA" are arranged and displayed. In this way, the processing to be executed by the computer upon designation of a folder of a classification item located immediately below the folder of the common metadata item basically follows the flowchart shown in FIG. 5.

More specifically, in this case, the CPU 105 specifies the folder of the classification item "column A to column NA" in step S501, and specifies the folders of common metadata items "size order" and "item type order" other than the designated common metadata item "title order" of the common metadata items "size order", "title order", and "item type order" displayed as information on the layer of hierarchy immediately above the designated classification item in step S502. In step S503, the CPU 105 lays out the folders of the common metadata items "size order" and "item type order" specified in step S502, and displays icons indicating contents data as sets with the metadata values classified to the classification item "column A to column NA" in step S402 of the metadata values classified to the folder of the classification item "2001" on the same layer of hierarchy.

That is, the aforementioned processing will be generally described below. More specifically, assume that the topmost layer of hierarchy is defined as a first layer of hierarchy, the second layer is defined as a layer of hierarchy immediately below the first layer of hierarchy, . . . , and the n-th layer of hierarchy is defined as a layer of hierarchy immediately below the (n−1)-th layer of hierarchy. Then, when the user selects one of common metadata items displayed as information on the (2n+1)-th (n≧1) layer of hierarchy as the (2n+1)-th selected common metadata item, the CPU 105 repeats the following processing.

First, the CPU 105 classifies metadata items of an item indicated by the (2n+1)-th selected common metadata item of those as sets with contents data indicated by icons (those which indicate contents data) displayed as information on the (2n+1)-th layer of hierarchy to any of a plurality of classification items determined based on the set conditions. Then, the CPU 105 list-displays the plurality of classification items as information on the (2n+2)-th layer of hierarchy. When the user selects one of the plurality of classification items as the (2n+2)-th selected classification item, the CPU 105 displays icons indicating contents data as sets with the metadata values classified to the (2n+2)-th selected classification items and common metadata items other than the (2n+1)-th selected common metadata item displayed as information on the (2n+1)-th layer of hierarchy, as information on the (2n+3)-th layer of hierarchy. Upon display, the CPU 105 arranges and displays information on the (n+1)-th layer of hierarchy immediately below that on the n-th layer.

By repeating the aforementioned processing as needed in this way, the folders of the common metadata items and those of classification items are hierarchically arranged and displayed and, as a result, the number of contents to be displayed can be narrowed down. For example, in the example of FIG. 10, the contents data displayed on the layer of hierarchy immediately below the folder of the classification item "column A to column NA" are narrowed down to three. However, when the user decides that it is difficult to search for target contents data from these three data, he or she further designates the folder of another common metadata item, thus narrowing down the number of contents data to be displayed in turn.

Conversely, if required contents data is found in an earlier stage, folder hierarchy tracing may end there. For example, contents data in the folder "2001" have already been narrowed down to a small number in the stage of FIG. 8. If the user can easily search for required contents data, the processing may end in this stage. If the number of contents data is large, the desired common metadata item is further selected to narrow down the candidates. The selection order of common metadata items is not limited.

The present invention is not limited to an alternate designation of the folders of common metadata items and those of the classification items which are displayed, but an arbitrary folder may be designated. In the description of this embodiment, the user designates in turn from folders of the upper layers of hierarchy, but he or she may designate a folder on an arbitrary layer of hierarchy.

Also, the present invention is not limited in the number of folders that can be designated at the same time. For example, the user may open a plurality of folders like a "moving image" folder and "still image" folder shown in FIG. 11 at the same time. Alternatively, the user may open a plurality of common metadata item folders like a "date of creation order" folder and "item type order" folder at the same time.

Note that this embodiment displays the common metadata items, classification items, and contents data in a form of folders, icons, and the like. However, various other display forms may be used as long as these items and data are displayed.

Second Embodiment

In the first embodiment, if there is a plurality of common metadata items to be displayed, all items are list-displayed. However, in this embodiment, only the designated common metadata item is displayed.

Figure 13:
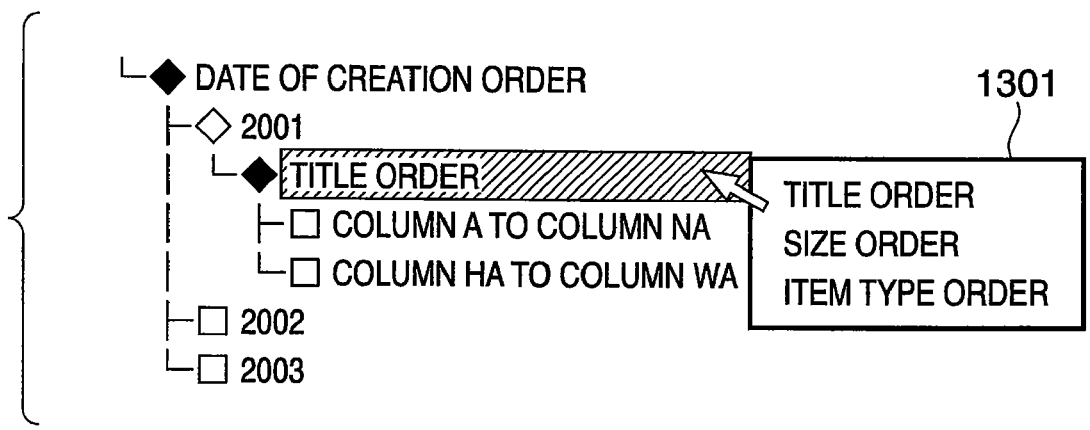
FIG. 13 shows a display example of a display form according to the second embodiment of the present invention.

FIG. 13 shows a display example of the display form according to this embodiment. Referring to FIG. 13, reference numeral 1301 denotes a pop-up menu which displays all selectable common metadata items. This pop-up menu 1301 is displayed when the corresponding item is designated using the input device 101.

Figure 14:
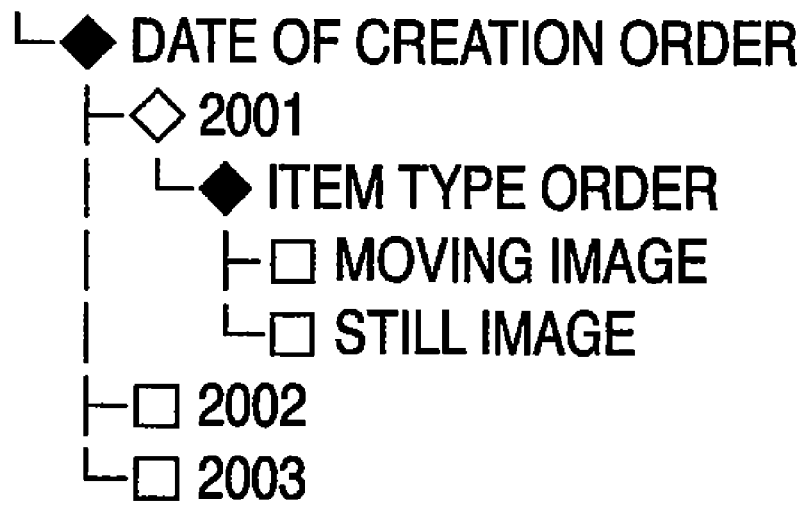
FIG. 14 shows a display example of a window displayed on the display screen of the output device 106 when the user selects "item type order" from a pop-up menu 1301.

When the user designates an arbitrary common metadata item on this pop-up menu 1301, he or she can determine the designated common metadata item. When the user selects "item type order" on the pop-up menu 1301, the common metadata item to be displayed is changed from "title order" to "item type order", as shown in FIG. 14. Of course, since the designated common metadata item has been changed, folders of classification items to be displayed as information on the layer of hierarchy immediately below that designated common metadata item are also changed.

Figure 21:
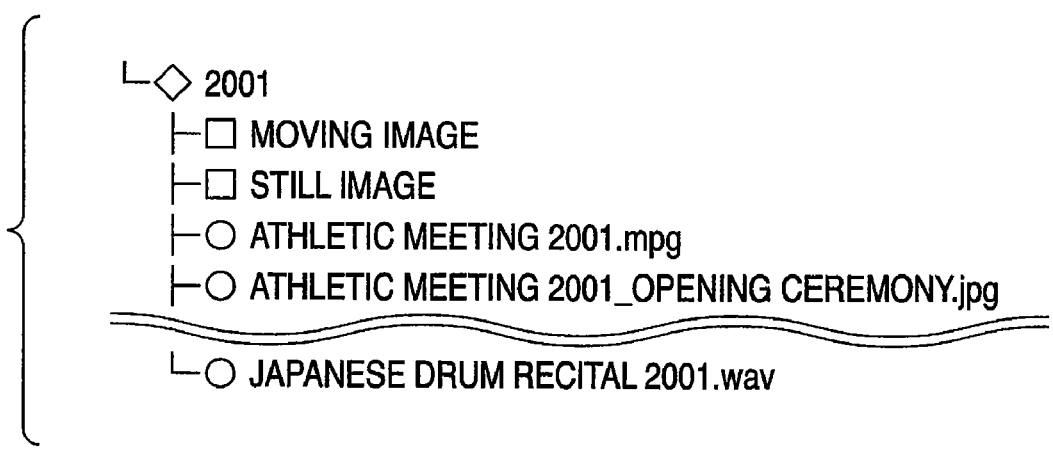
FIG. 21 shows a display example of a window displayed on the display screen of the output device 106 upon displaying folders of classification items of the selected common metadata item.

Furthermore, the folders of the common metadata items need not always be explicitly displayed. For example, when selection candidates of the common metadata items may be displayed in a pop-up list in a folder of a given classification item and one of these candidates is selected by the user ("item type" is selected in FIG. 20), as shown in FIG. 20, folders of classification items of the selected common metadata may be displayed, as shown in FIG. 21.

Note that the display form of the common metadata items is different from the first embodiment, but the processes other than that associated with display (for example, the process to be executed upon designation of the common metadata item and that to be executed upon designation of the folder of the classification item) are the same as those in the first embodiment.

Third Embodiment

In the first embodiment, the folders and icons are hierarchically displayed. However, the present invention is not limited to such a specific display form. In this embodiment, a list of information on the same layer of hierarchy is displayed on a single window, and the window is switched to another upon displaying information on a different layer of hierarchy.

Figure 15:
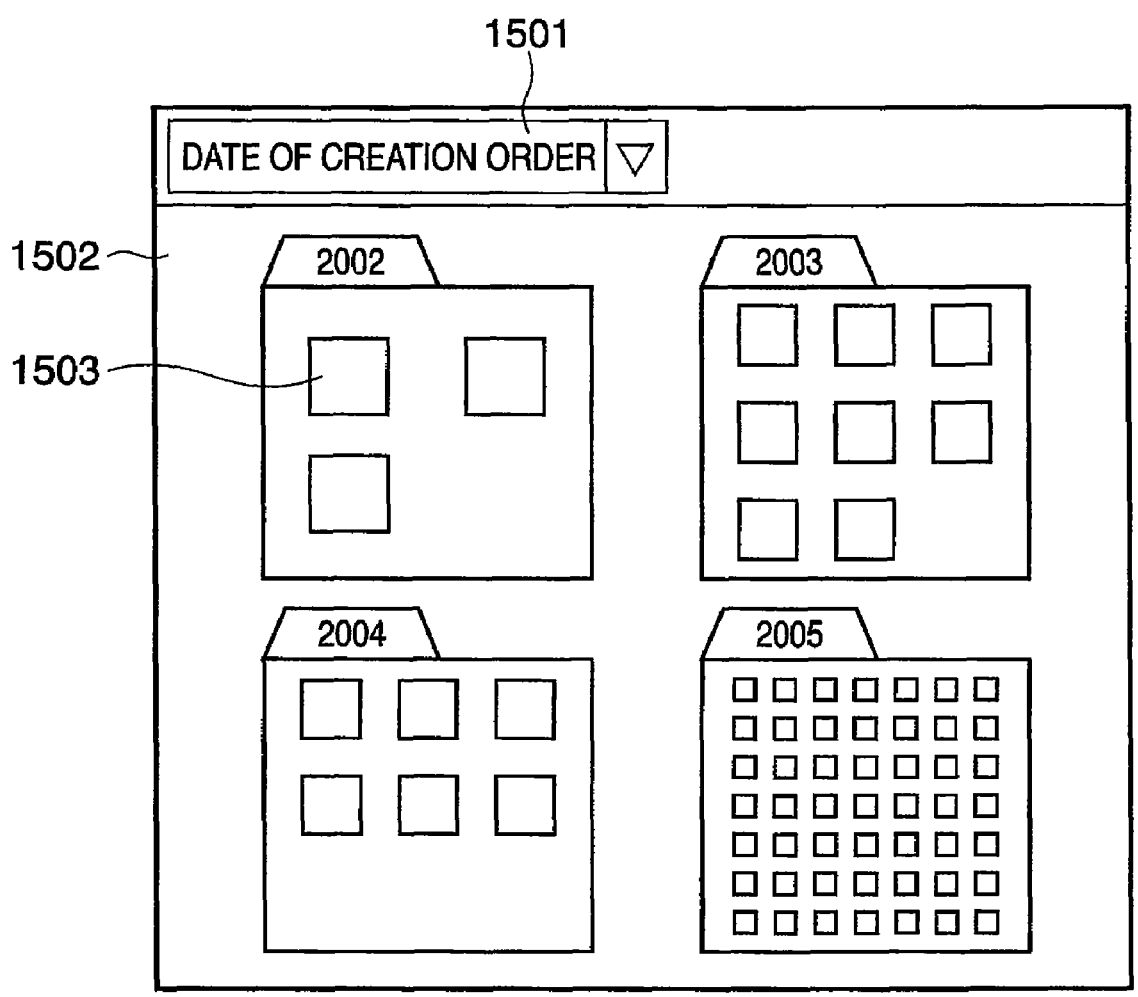
FIG. 15 shows a display example of folders of classification items.

FIG. 15 shows a display example of folders of classification items. In FIG. 15, "date of creation order" is selected as the common metadata item by designating a menu 1501, thereby designating "date of creation order" as the designated common metadata item. Then, folders of classification items "2002", "2003", "2004", and "2005" as information on the layer of hierarchy immediately below the designated common metadata item are list-displayed within an area 1502, and thumbnails 1503 of contents data classified to these folders are displayed on the respective folders.

As for the thumbnail, if contents data is image data, a reduced-scale image of that image may be created. If contents data is moving image data, a moving image with a small size may be created as a thumbnail or a reduced-scale image of a still image on a certain frame may be created as a thumbnail. Since contents data include audio data and the like in addition to image data, an icon indicating the type of contents data may be used as a thumbnail. Of course, every display form may be applied to thumbnails indicating contents data independently of the types of contents data.

Figure 16:
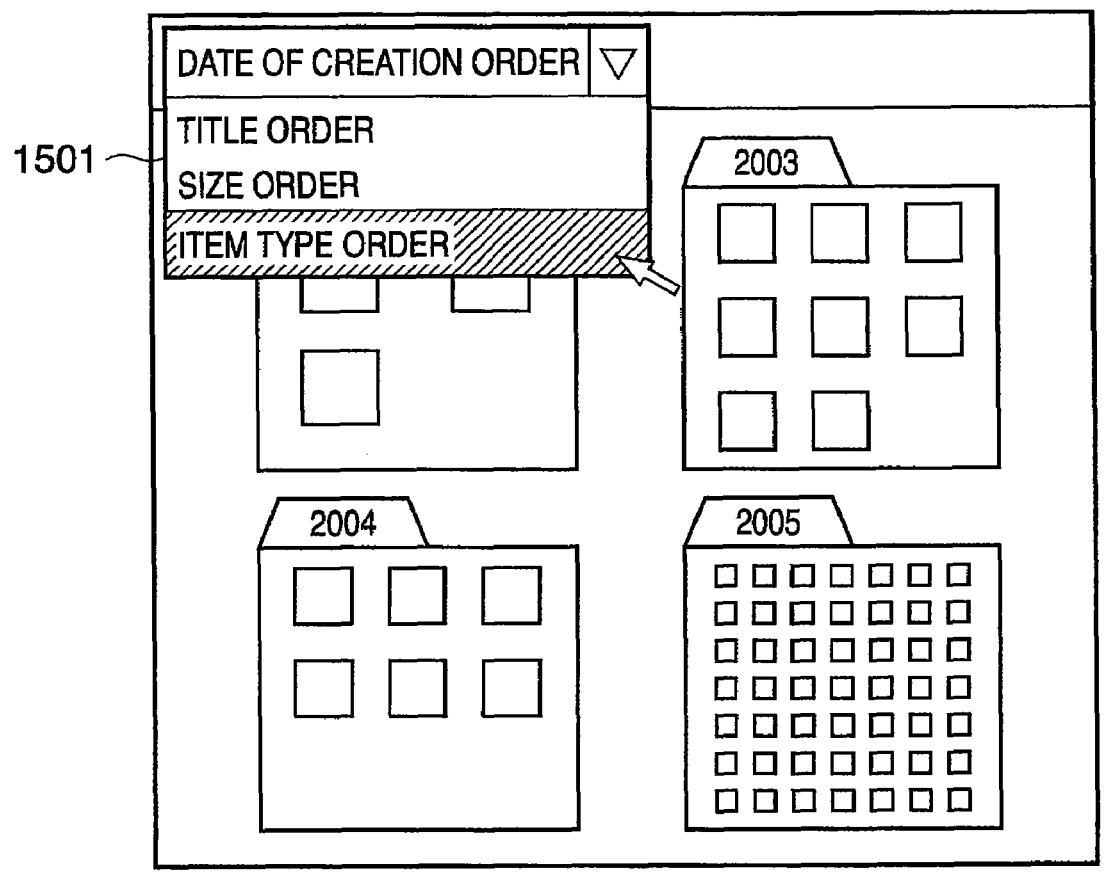
FIG. 16 shows a display example on the display screen of the output device 106 upon selection of "item type order" as a designated common metadata item.
Figure 17:
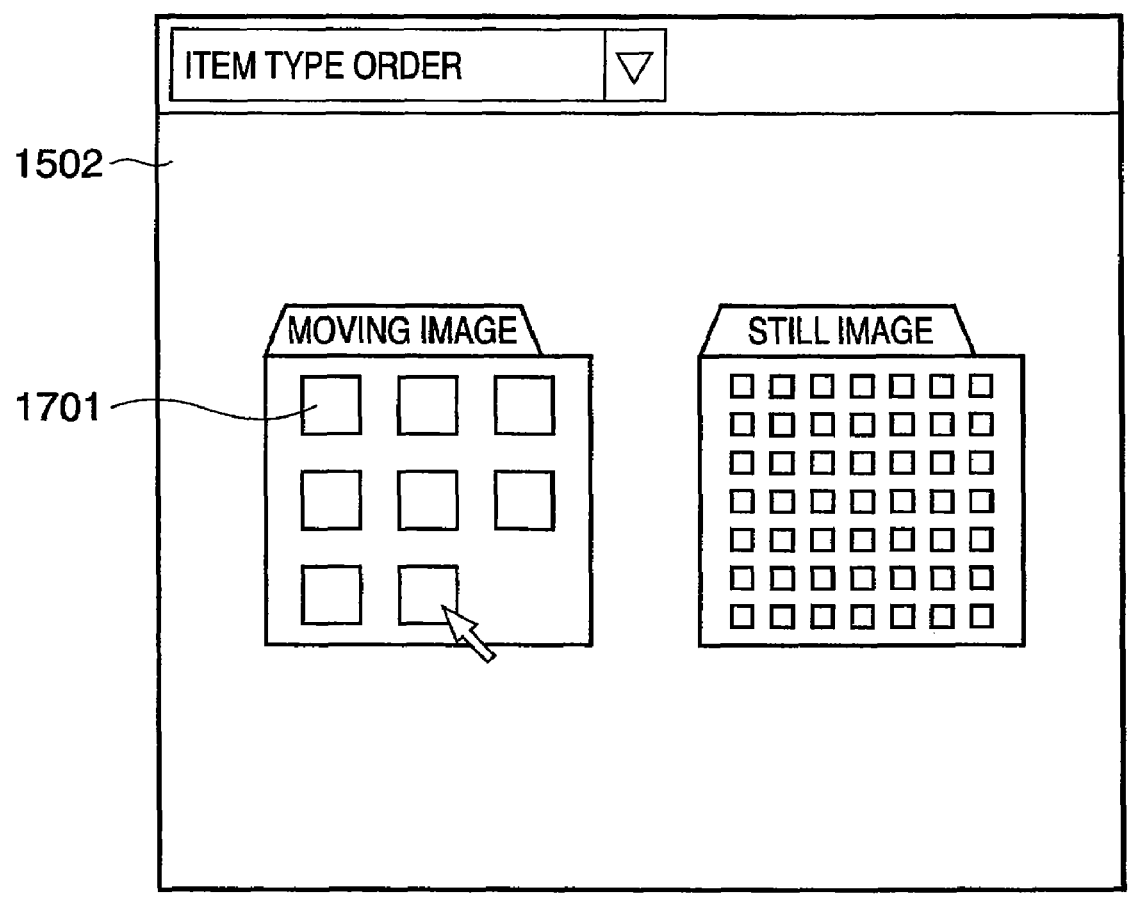
FIG. 17 shows a display example on the display screen of the output device 106 upon selection of "item type order" as a designated common metadata item.

Upon designation of the menu 1501, selectable common metadata items are displayed, as shown in FIG. 16. When the user selects "item type order" on this menu, "item type order" is selected as the designated common metadata item. The folders of classification items "moving image" and "still image" as information on the layer of hierarchy immediately below the designated common metadata item are list-displayed within the area 1502, and thumbnails 1701 of contents data classified to these folders are displayed on the respective folders, as shown in FIG. 17.

Note that the display form of the folders of the common metadata items and classification items, and thumbnails of contents data is different from that in the first embodiment, but the processes other than that associated with display (e.g., the process to be executed upon designation of the common metadata item and that to be executed upon designation of the folder of the classification item) are the same as those in the first embodiment.

Fourth Embodiment

In the above embodiments, the common metadata items which are further displayed upon designation of one folder of the classification item do not depend on the designated folder of classification item. However, upon designation of a certain folder of the classification item, if there is a metadata item common to only contents data classified to that classification item, these common metadata items may be displayed on the layer of hierarchy below the designated folder of the classification item.

In this case, when the CPU 105 specifies the common metadata item in step S502 in FIG. 5, it executes the following processing in addition to that described in the first embodiment. More specifically, the CPU 105 checks if there is an item common to metadata items of all contents data classified to the designated classification item specified in step S501. If there is such item, the CPU 105 also specifies that common metadata item.

Figure 18:
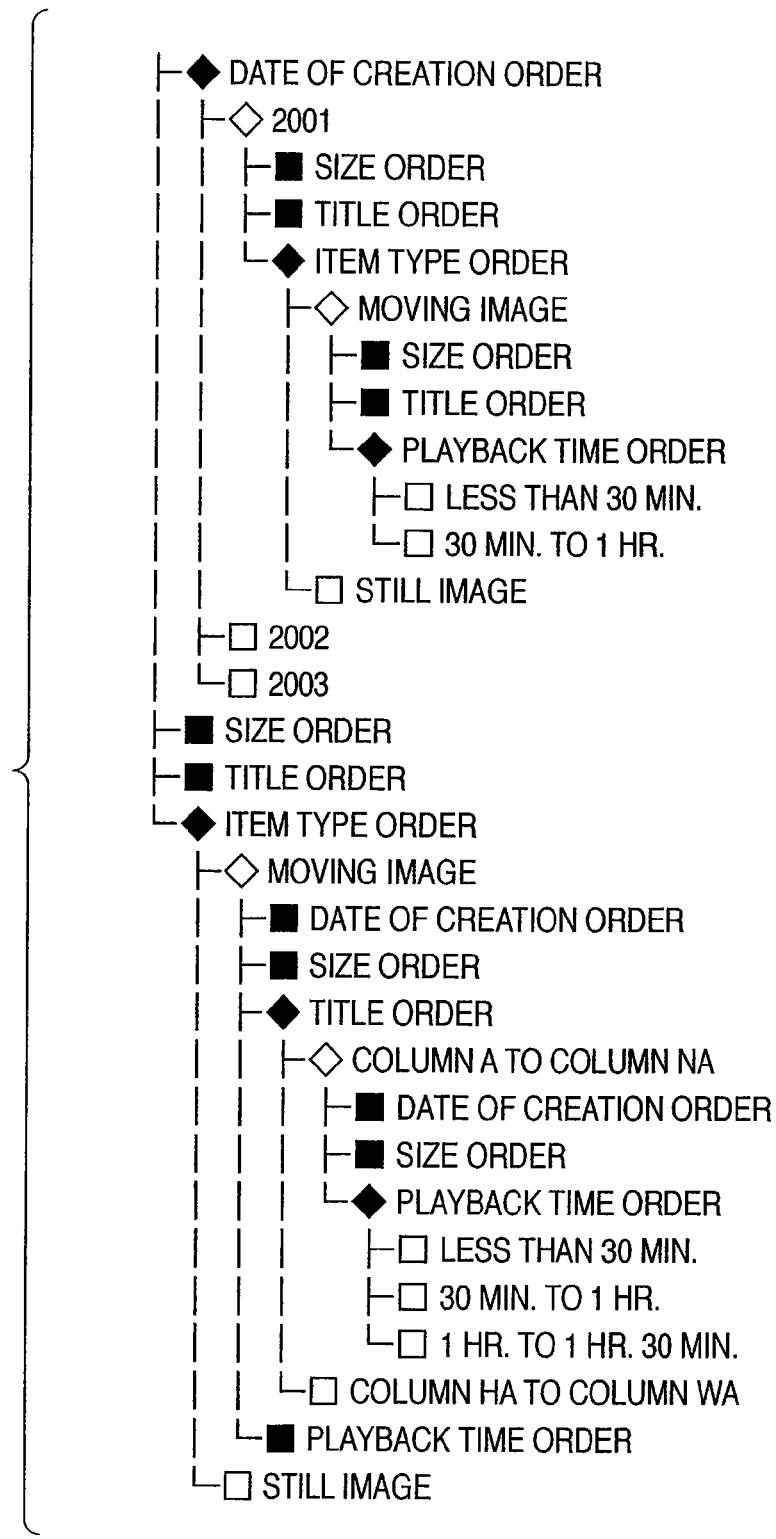
FIG. 18 shows a display example on the display screen of the output device 106 when "moving image" is available as a folder of a classification item of the common metadata item "item type", and "playback time" is available as a metadata item common to metadata items of contents data classified to this classification item.

As a result, as shown in FIG. 18, if there is "moving image" as the folder of the classification item of the common metadata item "item type" and if there is "playback time" as a metadata item common to the metadata items of contents data classified to that classification item, it is laid out.

Fifth Embodiment

As for respective common metadata items displayed in the above embodiments, an item which is not to be displayed may be set. With this setting, a common metadata item which is set not to be displayed is not displayed on every layer of hierarchy.

Figure 19:
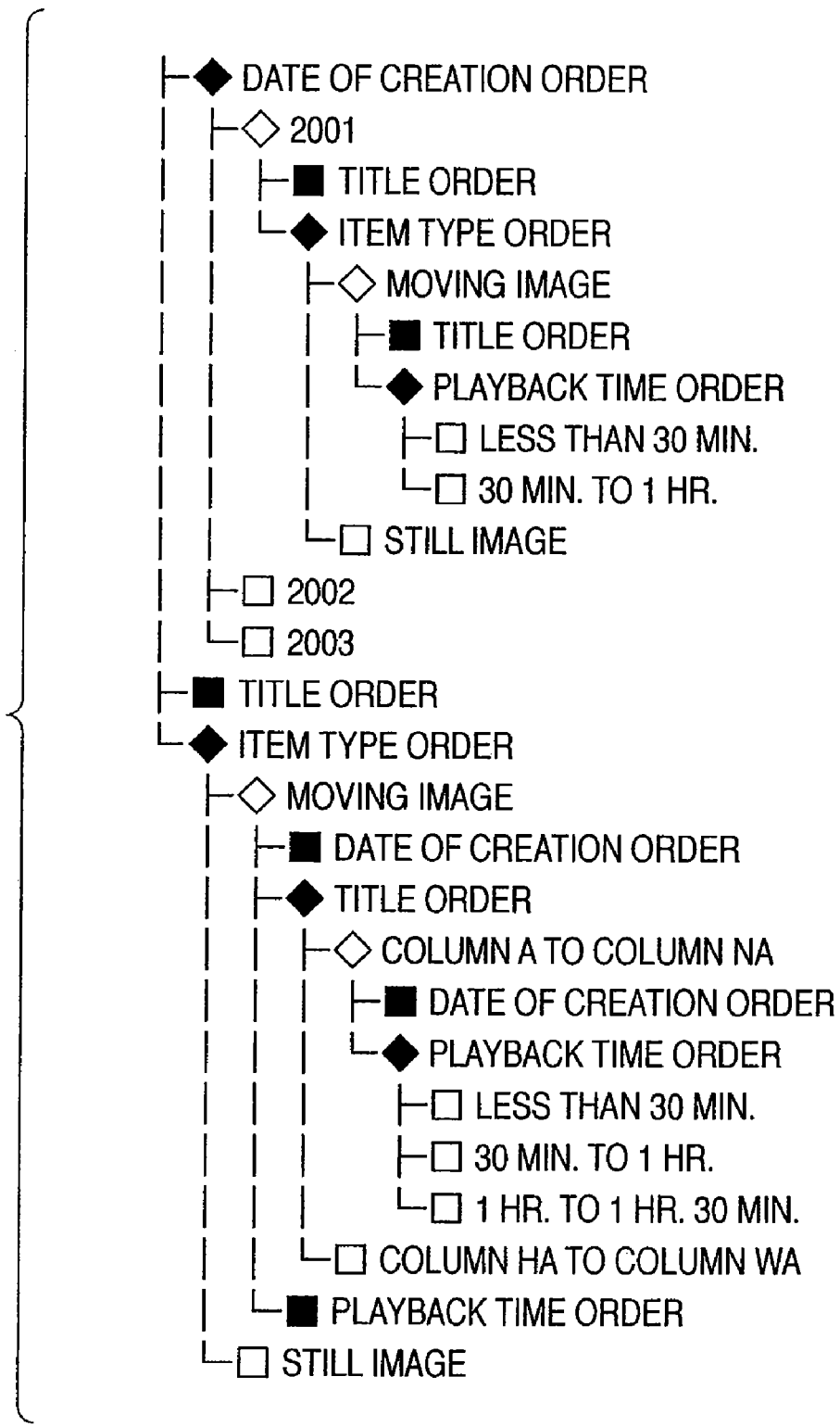
FIG. 19 shows a display example upon setting that a common metadata item "size" is not displayed in the arrangement of each embodiment of the present invention.

FIG. 19 shows a display example when a common metadata item "size" is set not to be displayed in the arrangement of each of the above embodiments.

This setting may be set to be applied to a specific layer of hierarchy and lower layers. For example, as exemplified in the fourth embodiment, since "playback time" which corresponds to "size" as the common metadata item of "moving image" or lower and is easier to understand is obtained, "size" may be set not to be displayed on "moving image" or lower. In this case, this setting is held in association with respective folders.

Note that the aforementioned embodiments may be combined as needed.

According to the above embodiments, the following effect can be obtained. That is, the user can easily conduct, by intuitive operations, complicated data search that searches for contents immediately below folders classified for respective metadata items by tracing the folder hierarchy, and narrowing down the number of contents using another item if desired contents data is not found.

Other Embodiments

The objects of the present invention are also achieved as follows. That is, a recording medium (or storage medium), which records a program code of a software program that can implement the functions of the above-mentioned embodiments, is supplied to a system or apparatus. A computer (or a CPU or MPU) of the system or apparatus reads out and executes the program code stored in the recording medium. In this case, the program code itself read out from the storage medium implements the functions of the above-mentioned embodiments, and the storage medium which stores the program code constitutes the present invention.

When the computer executes the readout program code, an operating system (OS) running on the computer executes some or all actual processes based on an instruction of the program code. The present invention includes a case wherein the functions of the above-mentioned embodiments are implemented by these processes.

Furthermore, assume that the program code read out from the recording medium is written in a memory equipped on a function expansion card or a function expansion unit, which is inserted into or connected to the computer. The present invention also includes a case wherein the functions of the above-mentioned embodiments may be implemented when a CPU or the like arranged in the expansion card or unit then executes some or all of actual processes based on an instruction of the program code.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-106626 filed Apr. 7, 2006 which is hereby incorporated by reference herein in their entirety.

What is claimed is:

1. An information processing apparatus comprising:
a holding unit which holds a plurality of pieces of contents data, each piece of contents data being associated with corresponding metadata, wherein the metadata includes a plurality of items associated with corresponding contents data and values of the respective items;
a specifying unit which specifies item commonly included in all pieces of the metadata held in said holding unit as common item;
a first display unit which displays one or more pieces of common item specified by said specifying unit as information on a first layer of hierarchy;
a classification unit which extracts, when one of the one or more pieces of common item displayed by said first display unit is selected as selected common item, values of the selected common item from all pieces of the metadata held in said holding unit and classifies the extracted values to any of a plurality of classification items;
a second display unit which displays a list of the plurality of classification items as information on a second layer of hierarchy as a layer of hierarchy immediately below the first layer of hierarchy; and
a third display unit which, when one of the plurality of classification items is selected as a selected classification item, specifies a plurality of pieces of contents data associated with a plurality of pieces of metadata from which values classified to the selected classification item are extracted, and displays a plurality of pieces of contents data information indicating the specified plurality of pieces of contents data, and a plurality of common items other than the selected common item of the one or more pieces of common item as information displayed on a third layer of hierarchy as a layer of hierarchy immediately below the second layer of hierarchy,
wherein information displayed by said second and third display units present hierarchical structure of the selected common item.

2. The apparatus according to claim 1, wherein all values classified into the same classification item have the same value.

3. The apparatus according to claim 1, further comprising:
a first unit which, when one of a plurality of pieces of the common item displayed as information on a (2n+1)-th ($n \geq 1$) layer of hierarchy is selected as (2n+1)-th selected common item, extracts values of the (2n+1)-th selected common item from a plurality of pieces of metadata associated with contents data indicated by a plurality of pieces of contents data information displayed as information on the (2n+1)-th layer of hierarchy and classifies the extracted values to any of a plurality of (2n+2)-th classification items;

a second unit which displays a list of the plurality of (2n+2)-th classification items as information on a (2n+2)-th layer of hierarchy; and a third unit which, when one of the plurality of (2n+2)-th classification items is selected as a (2n+2)-th selected classification item, specifies a plurality of pieces of contents data associated with a plurality of pieces of metadata from which values classified to the (2n+2)-th selected classification item are extracted, and displays a plurality of pieces of contents data information indicating this specified plurality of pieces of contents data and a plurality of common item other than the (2n+1)-th selected common item of the plurality of common item displayed as information on a (2n+1)-th layer of hierarchy, as information displayed on a (2n+3)-th layer of hierarchy.

4. The apparatus according to claim 3, wherein a plurality of pieces of information on an (n+1)-th layer of hierarchy are arranged and displayed immediately below information on an n-th layer of hierarchy.

5. The apparatus according to claim 3, wherein a plurality of pieces of information on an (n+1)-th layer of hierarchy are displayed after a window that displays information on an n-th layer of hierarchy is switched.

6. An information processing method comprising:

a holding step of holding a plurality of pieces of contents data, each piece of contents data being associated with corresponding metadata, wherein the metadata includes a plurality of items associated with corresponding contents data and values of the respective items;

a specifying step of specifying item commonly included in all pieces of the metadata held in said holding step as common item;

a first display step of displaying on a display device one or more pieces of common item specified in the specifying step as information on a first layer of hierarchy;

a classification step of extracting, when one of the one or more pieces of common item displayed in the first display step is selected as selected common item, values of the selected common item from all pieces of the metadata held in said holding step and classifies the extracted values to any of a plurality of classification items;

a second display step of displaying on said display device a list of the plurality of classification items as information on a second layer of hierarchy as a layer of hierarchy immediately below the first layer of hierarchy; and a third display step of, when one of the plurality of classification items is selected as a selected classification item, specifying a plurality of pieces of contents data associated with a plurality of pieces of metadata from which values classified to the selected classification item are extracted, and displaying on said display device a plurality of pieces of contents data information indicating the specified plurality of pieces of contents data and a plurality of common items other than the selected common item of the one or more pieces of common item as information displayed on a third layer of hierarchy as a layer of hierarchy immediately below the second layer of hierarchy, wherein information displayed in said second and third display steps present hierarchical structure of the selected common item.

7. A computer-readable storage medium for storing a computer program for making a computer execute an information processing method according to claim 6.

* * * * *